(12) United States Patent
Cedfors (10) Patent No.: US 10,112,478 B2
(45) Date of Patent: Oct. 30, 2018

(54) METHOD AND SYSTEM TO DETERMINE A RANGE FOR A VEHICLE

(71) Applicant: Scania CV AB, Södertälje (SE)

(72) Inventor: Dan Cedfors, Tullinge (SE)

(73) Assignee: Scania CV AB, Södertälje (SE)

( * ) Notice: Subject to any disclaimer, the term of this patent is extended or adjusted under 35 U.S.C. 154(b) by 100 days.

(21) Appl. No.: 15/039,827

(22) PCT Filed: Nov. 28, 2014

(86) PCT No.: PCT/SE2014/051419
§ 371 (c)(1),
(2) Date: May 26, 2016

(87) PCT Pub. No.: WO2015/084234
PCT Pub. Date: Jun. 11, 2015

(65) Prior Publication Data
US 2016/0375763 A1 Dec. 29, 2016

(30) Foreign Application Priority Data
Dec. 5, 2013 (SE) ...................................... 1351446

(51) Int. Cl.
*B60K 15/06* (2006.01)
*F02M 37/00* (2006.01)
(Continued)

(52) U.S. Cl.
CPC .......... *B60K 15/061* (2013.01); *B60R 16/023* (2013.01); *B60W 40/12* (2013.01);
(Continued)

(58) Field of Classification Search
CPC ............ G01F 25/0061; G01F 25/0007; B60K 15/061; B60K 15/06; B60R 16/023; B60W 40/12
(Continued)

(56) References Cited

U.S. PATENT DOCUMENTS

| 4,773,260 A * | 9/1988 | Ohno ................. F02M 37/0094 340/450.2 |
| 5,627,752 A | 5/1997 | Buck et al. |

(Continued)

FOREIGN PATENT DOCUMENTS

| DE | 102011104384 A1 | 12/2012 |
| WO | WO-2008/105720 A1 | 9/2008 |
| WO | WO-2014/134148 A2 | 9/2014 |

OTHER PUBLICATIONS

International Search Report for PCT/SE2014/051419 dated Apr. 21, 2015.

(Continued)

*Primary Examiner* — Gertrude Arthur Jeanglaude
(74) *Attorney, Agent, or Firm* — Moore & Van Allen PLLC; W. Kevin Ransom (57) ABSTRACT

A method is provided for estimating a range for a vehicle, where the vehicle includes a combustion engine and a fuel supply system associated with the combustion engine. Vehicle also includes a first main tank for receiving fuel, and a first fuel pump for transfer of fuel from the first main tank to the fuel supply system. The method estimates a range for the vehicle based on data relating to the road ahead of the vehicle and a first measure of residual fuel in the first main tank. The method further controls a required fuel reserve based on the data relating to the road ahead of the vehicle.

18 Claims, 4 Drawing Sheets

(51) Int. Cl.
- *B60W 40/12* (2012.01)
- *B60R 16/023* (2006.01)
- *F02M 37/08* (2006.01)
- *G07C 5/08* (2006.01)
- *G06F 19/00* (2018.01)
- *B60K 15/03* (2006.01)

(52) U.S. Cl.
CPC ........ *F02M 37/0088* (2013.01); *F02M 37/08* (2013.01); *G07C 5/08* (2013.01); *B60K 2015/03144* (2013.01); *B60K 2015/062* (2013.01); *B60K 2350/1092* (2013.01); *B60W 2550/143* (2013.01); *B60W 2560/02* (2013.01); *Y02T 10/84* (2013.01)

(58) Field of Classification Search
USPC .................... 701/123; 340/450.2; 73/114.54
See application file for complete search history.

(56) References Cited

U.S. PATENT DOCUMENTS

| | | |
|---|---|---|
| 6,263,916 B1 | 7/2001 | Rumpf |
| 9,267,835 B2 * | 2/2016 | Takahashi ............. F02D 41/222 |
| 2011/0175339 A1 | 7/2011 | Griesbaum |
| 2011/0313610 A1 | 12/2011 | Riegelman et al. |
| 2013/0226443 A1 | 8/2013 | Scofield et al. |

OTHER PUBLICATIONS

Written Opinion of the International Searching Authority of PCT/SE2014/051419 dated Apr. 21, 2015.
International Preliminary Report on Patentability of PCT/SE2014/051419 dated Sep. 21, 2015.
European Search Report from the European Patent Office for PCT/SE2014/051419 dated Jul. 12, 2017.

* cited by examiner

METHOD AND SYSTEM TO DETERMINE A RANGE FOR A VEHICLE

CROSS-REFERENCE TO RELATED APPLICATIONS

This application is a national stage application (filed under 35 § U.S.C. 371) of PCT/SE2014/051419, filed Nov. 28, 2014 of the same title, which, in turn, claims priority to Swedish Application No. 1351446-8 filed Dec. 05, 2013 of the same title; the contents of each of which are hereby incorporated by reference.

FIELD OF THE INVENTION

The present invention relates to a method to determine a range for a vehicle. The invention also relates to a system and a vehicle, as well as a computer program and a computer program product, which implement the method.

BACKGROUND OF THE INVENTION

The present invention relates to fuel systems in vehicles, and in particular heavy goods vehicles such as trucks, buses and working machines. These types of vehicles are often relatively heavy and often also travel long distances. Overall, this entails a requirement that the vehicles be equipped with relatively large fuel tanks. For example, such vehicles may be equipped with a fuel tank with a volume in the range of 500-1,000 liters, where such volume may also be divided into two fuel tanks arranged in the vehicle.

The fuel tanks accordingly consist of relatively large volumes, which means that when the fuel level decreases, the residual fuel will move around inside the fuel tank depending on the vehicle's movements. Fuel transfer from the fuel tank to the vehicle's combustion engine is usually carried out with the use of an armature submerged in the fuel tank, with an inlet through which the fuel is sucked up with the help of a pump. In order for fuel to be sucked up with said pump, however, the armature's inlet must be surrounded by fuel, not air.

In order to ensure that this is the case, e.g. when driving the vehicle on an uphill and/or downhill slope, usually a least required residual volume is applied, at which refilling of fuel is required in order to avoid the risk of fuel, at lower volumes, accumulating in the fuel tank in such a way that the fuel no longer surrounds the inlet of the armature, e.g. due to inclination. If the fuel pump starts to draw air, the consequence is that the fuel supply to the combustion engine's combustion chamber is interrupted, which in turn leads to the engine stalling.

SUMMARY OF THE INVENTION

One objective of the present invention is to provide a method to estimate a range for a vehicle. This objective is achieved with a method according to claim 1.

The present invention relates to a method for estimating a range for a vehicle, wherein said vehicle comprises a combustion engine and a fuel supply system associated with said combustion engine, e.g. an injection system, wherein the vehicle also comprises a first main tank for receiving fuel, and a first fuel pump for transfer of fuel from said first main tank to said fuel supply system. The method comprises:

estimating a range for said vehicle based on data relating to the road ahead of the vehicle and a first measure of the residual fuel in said first main tank.

According to the above, at lower volumes and during certain driving conditions, there may be a risk of the fuel in the fuel tank not surrounding the inlet of the armature, with a risk of stalling as a consequence, and for this reason a minimum remaining volume in the fuel tank, at which fuel should be filled up again to avoid the risk of stalling, is often applied. This required residual volume may be very large, and may e.g. be in the range of 20% of the fuel tank's total volume. This means that vehicles with large fuel tanks are constantly burdened by a large extra volume, and therefore weight, which in practice may be used only very rarely or never. This large residual volume may also have a psychologically negative impact on a driver who is advised to refuel, even though hundreds of liters of fuel may still remain in the vehicle's one or more petrol tanks.

The present invention provides a method to reduce such problems. According to the invention, data relating to the vehicle's base surface are used, such as the road ahead of the vehicle, e.g. the road inclination for a road section ahead, together with a measure of the residual fuel amount in the vehicle's one or several fuel tanks in order to estimate a range for the vehicle, i.e. a distance which the vehicle may travel before it is forced to refuel in order to avoid the risk of stalling, e.g. because of the road inclination.

This means that the required fuel reserve may be controlled based on said data relating to the road ahead of the vehicle, whereby the fuel reserve may be made smaller when the conditions to be able to draw up fuel from said first main tank are expected to be good, while, conversely, a larger reserve may be required when the conditions are expected to be less favorable.

According to one embodiment, a transfer tank is applied, which is arranged between said fuel supply system and said first main tank, also called a "catch tank", but referred to below as a transfer tank, wherein the method comprises supplying fuel to said transfer tank from said first main tank before transfer to said fuel supply system, and wherein said transfer tank constitutes a smaller tank compared to said first fuel tank. The transfer tank's volume may e.g. constitute a volume within the range 1-10% or 1-5% of said main tank's total volume.

The transfer tank is therefore significantly smaller than the main tank, which means that it is also less sensitive to the fuel's movements inside the tank, caused by movements and road gradients. When the transfer tank is filled, it therefore acts as a buffer at times when fuel may not be sucked out of the main tank, whereat fuel may be transferred to the fuel supply system from the transfer tank also when fuel in said first main tank is not available, and whereat the transfer tank may be refilled when conditions so permit and the main tank's fuel is available again. Such a solution thus permits that an even greater fraction of the main tank's fuel may be used before refilling is required. Transfer to said transfer tank is advantageously carried out by a fuel pump powered with an electric motor, whereat such fuel pump may be controlled based on access of fuel to be sucked up.

Furthermore, said first measure of residual fuel in said first main tank may at least partly be estimated based on a rate at which said transfer tank is filled with fuel from said first main tank, whereat the filling time will be longer when the amount of fuel in the main tank is smaller, and a larger fraction of air is sucked up by the fuel pump. The measure may also be estimated at least partly based on the size of a drive current for an electric motor, which operates said first fuel pump. Likewise, the measure may also at least partly be based on a float arranged in said first main tank. The filling rate and drive current may, however, many times provide a significantly more accurate estimation of the remaining amount of fuel compared to the use of a float, which also means that a larger fraction of the fuel may be used without risking an incorrect estimate of the remaining amount of fuel.

Further characteristics of the present invention and advantages thereof will be described in the detailed description of example embodiments set out below and in the enclosed drawings.

DETAILED DESCRIPTION OF PREFERRED EMBODIMENTS

Figure 1A:
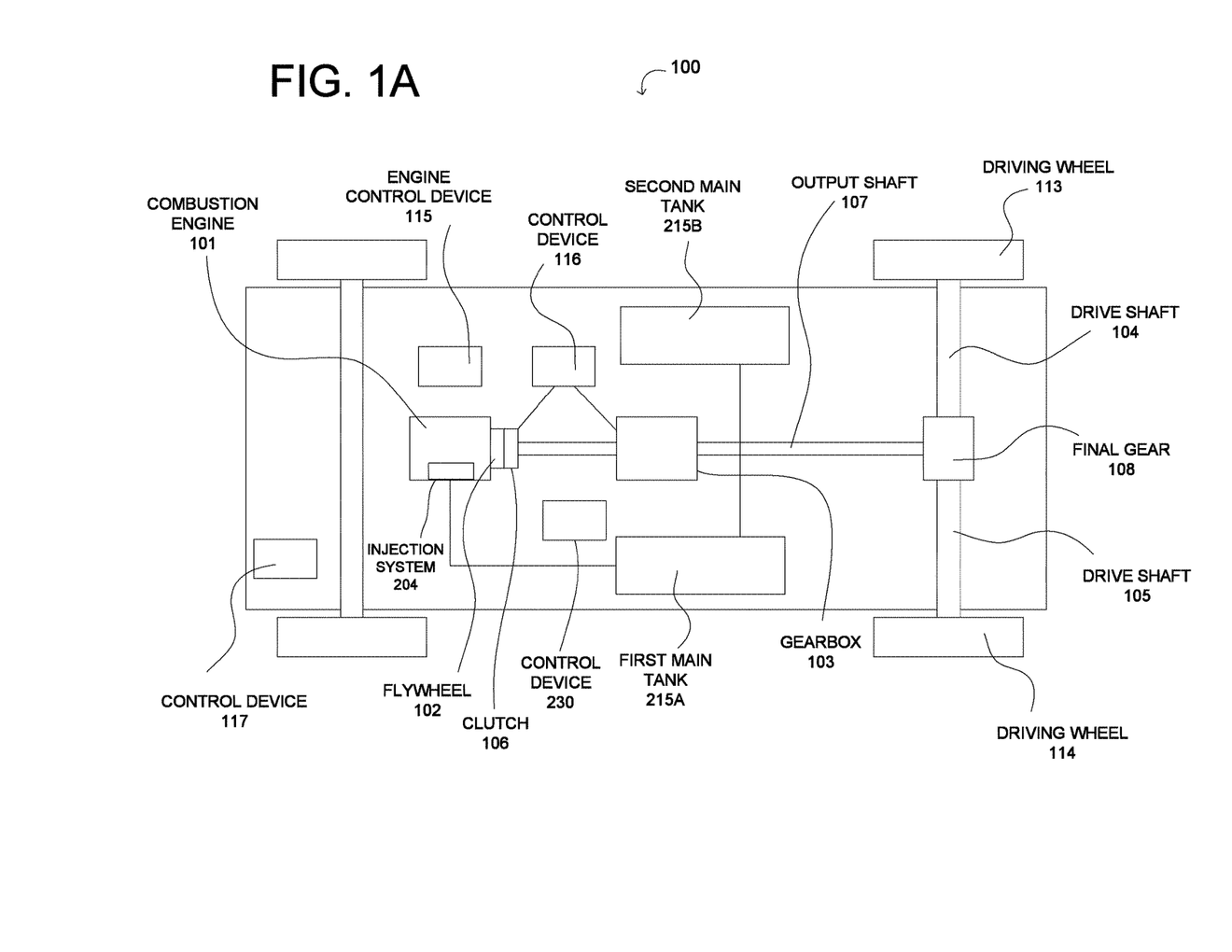
FIG. 1A shows a powertrain in a vehicle, in which the present invention may advantageously be used.

FIG. 1A schematically shows a driveline in a vehicle 100, according to an embodiment of the present invention. The vehicle 100, shown schematically in FIG. 1A, comprises a driveline with a combustion engine 101, which in a customary manner, via an output shaft on the combustion engine 101, usually via a flywheel 102, is connected to a gearbox 103 via a clutch 106. The combustion engine 101 is controlled by the control system 100 of the vehicle via an engine control device 115. Likewise, in the present example, the clutch 106 and the gearbox are controlled by a control device 116.

Further, an output shaft 107 from the gearbox 103 drives the driving wheels 113, 114 via a final gear 108, e.g. a customary differential, and the drive shafts 104, 105 connected to said final gear 108. FIG. 1A thus shows a powertrain of a specific type, but the invention is applicable to all types of powertrains, and also to all types of vehicles, as long as these are powered by a combustion engine.

The vehicle displayed also comprises a fuel system, wherein FIG. 1A shows two fuel tanks 215A, 215B from which fuel is supplied to a fuel supply system arranged at the combustion engine 101, in the present example an injection system 204. The fuel system's functions are controlled by a control device 230. Further details in the exemplified fuel system are displayed in FIG. 2, and are described below.

According to the present invention, a range is estimated for the vehicle, based on a measure of the residual fuel and information about the road ahead of the vehicle. The method according to the invention may be arranged to be carried out by some applicable control device in the vehicle's control system, and may e.g. be arranged to be carried out by the control device 230 or another applicable control device occurring in the vehicle, such as the engine control device 115. The control device may thus consist of any suitable control device in the vehicle's control system. The invention may also be implemented in a control device dedicated to the present invention.

Generally such control systems consist of a communications link system, consisting of one or several communication buses to connect a number of electronic control devices (ECUs), or controllers, and different components arranged on the vehicle 100. Such a control system may thus comprise a large number of control devices, and the responsibility for a specific function may be distributed among more than one control device. For the sake of simplicity, in FIG. 1A only a very limited number of control devices are displayed.

The function of the control device 230 (or the control device(s) in which the present invention is implemented), according to the present invention, may e.g. depend on signals from different sensors, where examples of such sensors are described below in connection with FIG. 2. Furthermore, the function according to the invention may depend on signals from the fuel pump or pumps handling the transfer of fuel from the fuel tank to the injection system, as described below. The control may also depend on signals from one or several other control devices, such as data regarding the vehicle's path ahead of the vehicle, received from the control device 117.

Furthermore, the control is often carried out by programmed instructions. These programmed instructions typically consist of a computer program, which, when it is executed in the control device, causes the control device to carry out the desired control action, such as method steps according to the present invention.

Figure 1B:
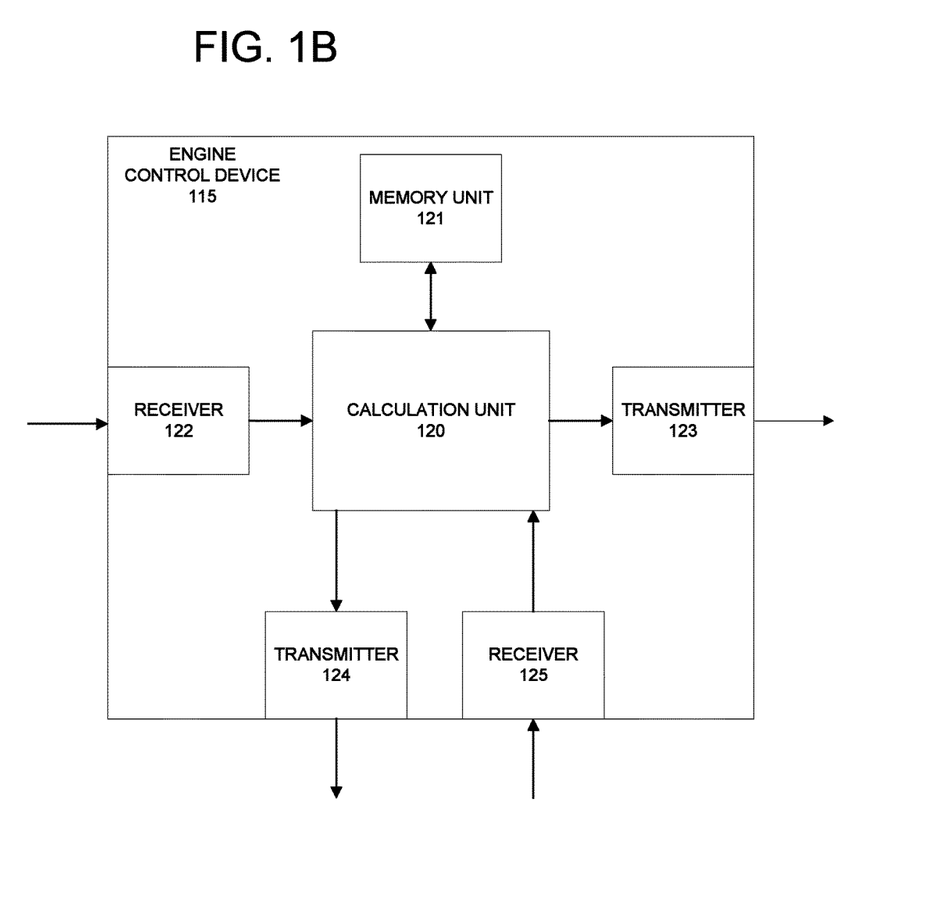
FIG. 1B shows a control device in a vehicle control system.

The computer program is usually a part of a computer program product, where the computer program product comprises an applicable storage medium 121 (see Fig. IB), with the computer program stored on said storage medium 121. Said digital storage medium 121 may e.g. consist of any from the following group: ROM (Read-Only Memory), PROM (Programmable Read-Only Memory), EPROM (Erasable PROM), Flash, EEPROM (Electrically Erasable PROM), a hard disk unit, etc., and may be set up in or in combination with the control device, where the computer program is executed by the control device. By changing the computer program's instructions, the vehicle's behavior may thus be adjusted in a specific situation.

One example control device (the control device 230) is displayed schematically in FIG. 1B, and the control device in turn may comprise a calculation unit 120, which may consist of e.g. a suitable type of processor or microcomputer, e.g. a circuit for digital signal processing (Digital Signal Processor, DSP), or a circuit with a predetermined specific function (Application Specific Integrated Circuit, ASIC). The calculation unit 120 is connected to a memory unit 121, which provides the calculation unit 120 with e.g. the stored program code and/or the stored data that the calculation unit 120 needs in order to be able to carry out calculations, e.g. to determine whether an error code must be activated. The calculation unit 120 is also set up to store interim or final results of calculations in the memory unit 121.

Further, the control device is equipped with devices 122, 123, 124, 125 for receiving and sending of input and output signals. These input and output signals may contain waveforms, pulses or other attributes which, by the devices 122, 125 for the receipt of input signals, may be detected as information for processing by the calculation unit 120. The devices 123, 124 for sending output signals are arranged to convert the calculation result from the calculation unit 120 into output signals for transfer to other parts of the vehicle's control system and/or the component(s) for which the signals are intended. Each one of the connections to the devices for receiving and sending of input and output signals may consist of one or several of the following: a cable; a data bus, such as a CAN (Controller Area Network) bus, a MOST (Media Oriented Systems Transport) bus, or any other bus configuration; or of a wireless connection.

Figure 2:
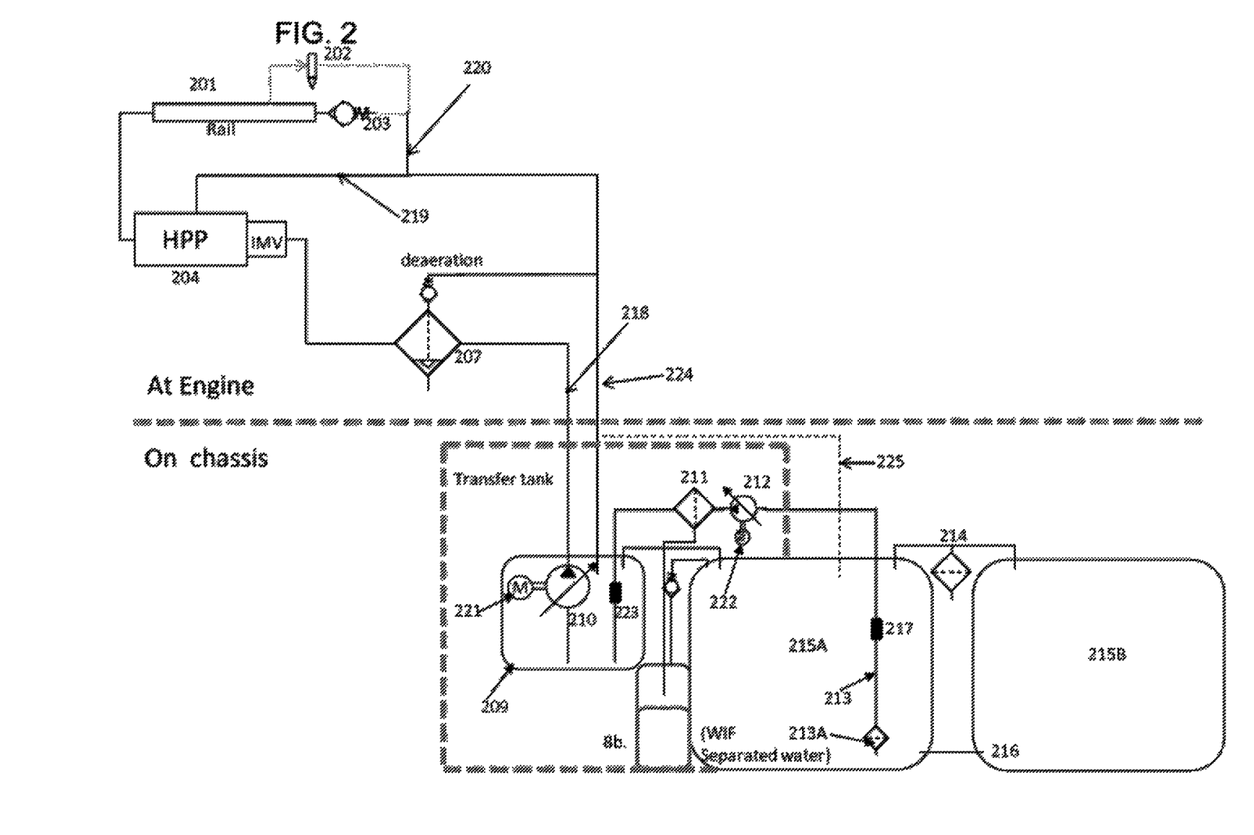
FIG. 2 schematically shows a fuel system, in which the present invention may be applied.
Figure 3:
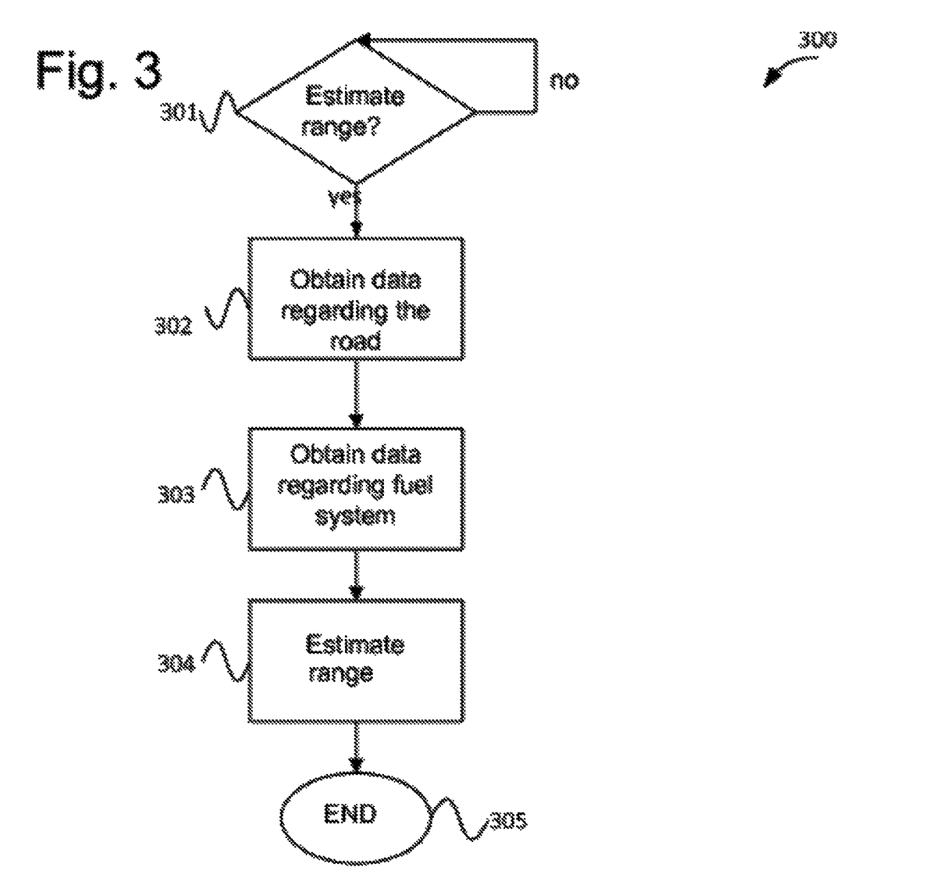
FIG. 3 schematically shows an example method according to one embodiment of the present invention.

One example method according to the invention is displayed in FIG. 3, and the invention will be exemplified in connection with the fuel system displayed in FIG. 2. The present invention is applicable for all types of fuel systems, such as a conventional system with a fuel tank and a fuel pump which transfers fuel to the combustion engine, wherein the fuel pump is usually powered by the combustion engine and is thus in operation when the combustion engine is in operation. The invention is particularly applicable, however, for fuel systems of the type displayed in FIG. 2, and the versions of the fuel system, which are described in connection with FIG. 2.

Returning to the method 300, this starts at step 301, where it is determined whether the vehicle's range must be estimated, i.e. how long a distance it is expected that the vehicle may be driven before refueling will be required. The method remains at step 301 as long as such an estimation not is to be carried out. When the estimation is to be carried out, the method continues to step 302. According to one embodiment, the vehicle may be arranged to continuously estimate the range, i.e. the criterion for transition from step 301 to step 302 may always be deemed to be met.

According to one embodiment, the transition from step 301 to step 302 may be arranged to occur e.g. when a measure of the vehicle's residual fuel amount falls below some level, which may e.g. be determined at least partly with the use of a float arranged in the main tank, or with the use of fuel pump data as described below. The transition may also be based on an expected residual fuel amount falling below some applicable fuel amount, where the expected residual fuel amount may e.g. be estimated based on the distance driven and the estimated fuel consumption.

Generally, in relation to fuel systems, in many vehicles today a fuel pump, arranged in connection with the combustion engine, is used to draw up fuel, wherein the fuel pump is mechanically connected to the combustion engine and operated by the combustion engine's driving shaft. This solution entails that the fuel pump must be able to pump a relatively large amount of fuel already at a low rotation speed, i.e. a lower rotation speed than the combustion engine's engine speed at idling, in order to be able to pump a sufficient amount of fuel to the combustion engine when the starter is working, in order to enable the combustion engine to start at all. This in turn means that the fuel pump, while driving, will be over-sized and thus continuously pumping a large amount of fuel, which must then be diverted and returned to the fuel tank. This excess pumping obviously leads to unwanted losses.

In the system displayed in FIG. 2, two main tanks are used, 215A, 215B, each of which contains a relatively large amount of fuel, e.g. a fuel amount within the range 300-1,000 liters. Use of several tanks may make it possible to obtain a greater fuel capacity overall, than what might otherwise be possible with the use of one single tank, since there may be a shortage of larger connected spaces in vehicles, and in which case it thus may be difficult to find a possible space for a single tank of the desired size.

The two main tanks 215A, 215B are connected with each other via a passage 216 in the lower section of the tanks 215A, 215B, so that fuel may flow from one tank to the other. Likewise, the tanks are connected with each other at the upper edge, via an exhaust air filter 214.

Fuel is drawn up from the main tank 215A, to which the fuel in the main tank 215B also flows, via a fuel armature 213. The inlet 213A of the fuel armature 213 is preferably arranged low down in the tank, i.e. near the bottom of the tank, to facilitate as large a volume as possible to be drawn up. A certain distance from the bottom of the tank may be advantageous, e.g. with the objective of avoiding drawing up of gravel, debris and other objects that may have entered the tank. The fuel level in the tank may be determined with the use of a level sensor 217. The fuel is drawn up by a fuel pump 212, and the fuel drawn up by the pump 212 is pumped, in the present example, via a pre-filter 211 for separation of water in a conventional manner, to a significantly smaller tank 209, which thus constitutes an intermediate tank, hereinafter referred to as a transfer tank. The size of the transfer tank 209 may e.g. be in the range of 15-50 liters, or have a size, which in relation to the main tanks' total volume constitutes a volume within the range 1-10% or 1-5% of the main tanks' total volume. Furthermore, the transfer tank's geometry is preferably such that it has a height exceeding, or preferably significantly exceeding, the width and the depth. The transfer tank is thus preferably relatively high and relatively narrow in order to reduce, to the extent possible, the negative impact of sloshing.

The pump 212 for transfer of fuel from the main tanks 215A, 215B to the transfer tank 209 may, advantageously, be arranged inside the transfer tank 209, which is indicated with dashed lines in FIG. 2. The fuel pump 212 in this case does not consist of a fuel pump powered by the combustion engine 101, but of a fuel pump powered by an electric motor 222, as described below. According to the displayed embodiment, a second fuel pump 210 is also used, which is used for transfer of fuel from the transfer tank 209 to the injection system of the combustion engine 101. The fuel pump 210 may also be powered by an electric motor 221 and be arranged in the transfer tank 209, as well as the fuel filter 211. By arranging the fuel pumps, as well as the respective electric motors 221, 222 for control of the fuel pumps, in the transfer tank 209, the fuel may be used for cooling of components, while, conversely, the fuel may be heated by excess heat from electric motors/fuel pumps. The respective fuel pumps as well as the fuel filter 211 may, alternatively, be arranged outside the fuel tanks.

In the present example, the fuel is then led from the transfer tank 209, via a conduit 218 and a second fuel filter 207, to an injection system, where a high pressure pump (or another mechanical pressure increasing device, such as e.g. a unit injector) 204 pressurizes the fuel at a very high pressure, which fuel is supplied to a common rail 201 for supply to the combustion engine's combustion chamber via the respective injectors 202.

The injection system displayed in FIG. 2 thus consists of a so-called Common Rail system, which also entails that all injectors (and therefore combustion chambers) are supplied by the common fuel rail 201 (Common Rail). The pressure in the common rail 201 may be controlled with the use of a valve 203. In relation to the fuel filters, their function is not described here, since such function is commonly known.

Excess fuel from the high pressure pump 204 may be returned to the transfer tank 209 (according to the present example), alternatively to the main tanks 215A, 215B (indicated with a dashed line 225), via a conduit 219, 224. Also, excess fuel from injectors 202 and/or fuel rails 201 may be returned in a similar way from an excess conduit 220, 224. The returned fuel may also consist of lubricating fuel for the high pressure pump 204 and the injectors 202, etc. The returned fuel is usually heated, whereat such excess heat may be used to heat fuel by return to an applicable fuel tank, as described above.

In the system displayed, two fuel pumps 210, 212 are thus displayed, for transfer of fuel from the main tank to an injection tank. The solution displayed has the advantage that, with the use of the significantly smaller transfer tank described above, which is thus also significantly less sensitive to sloshing fuel and the vehicle's gradient, together with the use of the two pumps 210, 212, the range may be extended further, compared to when the invention is used in a conventional fuel system. For example, the pump 212 may pump fuel from the main tanks 215A, 215B to the transfer tank 209 when the gradient of the vehicle 100 is such that this transfer of fuel is possible, while, in situations when such transfer is not possible, the fuel in the transfer tank 209 is used as a buffer, until the fuel may be transferred from the main tank again. With the use of this solution, the utilization of the fuel in the main tanks may thus be enhanced further.

Furthermore, the fuel pumps 210, 212 displayed, advantageously and according to the present example, constitute electrically controlled fuel pumps, i.e. the pumps 210, 212 are controlled, as described above, by each of their respective electric motors 221, 222. The invention according to the present example uses the intelligence of at least one of these pumps in combination with information about the road ahead of the vehicle, in order thus to be able to determine the vehicle's range with greater accuracy.

Reverting to the method displayed in FIG. 3, data regarding the road ahead of the vehicle is obtained in step 302. The control device 230 may be arranged to continuously receive data relating to the road ahead of the vehicle from the control device that handles such information. Such information may e.g. consist of map data together with positioning data, alternatively other applicable descriptions of the road conditions ahead of the vehicle. For example, it is becoming increasingly common for vehicles to comprise a so-called Look Ahead (LA) function, which controls different vehicular functions based on the appearance of the road ahead of the vehicle. For example, with the objective of saving fuel a cruise control function may allow a vehicle to reduce speed ahead of the brow of a hill, if the vehicle on a subsequent slope is expected to accelerate to a desired speed. This look ahead function, or a similar function, may thus be used to provide the control device 230 with information about the appearance of the road ahead of the vehicle. For example, such cruise controls may simulate how the vehicle will behave when it travels along a future road section, which may also be used at the estimation of the range according to the present invention. In the present example, this functionality is provided by a control device 117 (FIG. 1A).

In step 302, data is thus obtained relating to the road ahead of the vehicle for some applicable road section. For example, data relating to the road ahead of the vehicle may be obtained up to a future filling station, or for a distance corresponding to, or approximately corresponding to, the remaining range for the vehicle. In step 303, data relating to the fuel system is then obtained, wherein such data may comprise the level of the level sensor 217 level, as well as information from a level sensor 223 arranged in the transfer tank 209. Furthermore, data relating to in particular the control of the pump 212 may be obtained, where such data may e.g. consist of the size of the current with which the electric motor 222 powers the pump 212.

If the pump 212 pumps air, or fuel with a large air content, the pump 212 will perform a smaller amount or work, compared to pumping of pure fuel, with a lower electric motor load, and with a lower power consumption as a result. Conversely, the power consumption will be higher when substantially air-free fuel is pumped. This current may thus provide a good indication of the fuel level in the main tank 215A (and therefore also in the tank 215B), since it may be detected when the pump 212 begins to draw air.

Instead of, or in addition to, using power consumption, the filling time for filling of the transfer tank may be used, i.e. how long it takes to fill the transfer tank with the help of the pump 212. This may be determined e.g. with the use of the level sensor 223. When the pump 212 begins to draw a mixture of air and fuel, it will take longer for the transfer tank to be filled. Changes in the filling time may thus be used as a parameter at the determination of the fuel amount actually remaining in the main tanks.

Such information may also be combined with information about the vehicle's prevailing gradient, and tabled values may also be used, where e.g. parameters may be calibrated in advance, e.g. at manufacture, wherein a very god estimation of the current fuel level may be performed, e.g. by, with the use of the table, determining the fuel amount based on the prevailing gradient or other driving conditions such as acceleration, and filling time and/or power consumption. Alternatively, an applicable algorithm may be used, where parameters in the algorithm may be determined empirically.

In step 304, a range for the vehicle is then estimated based on the above data, where, with the use of the knowledge about the road ahead of the vehicle, it may be estimated whether the residual fuel will be accessible for pumping to the transfer tank and hence to the injection system. Accordingly, a range may also be estimated, where possible utilization of available fuel will depend on the variations of the road ahead of the vehicle, where it may be estimated whether it will be possible to fill the transfer tank sufficiently often to avoid risking that it becomes empty, with stalling of the engine as a consequence.

As long as the transfer tank may be filled to a sufficient extent, e.g. because the road ahead of the vehicle contains straight sections with expected even speed, and with applicable intervals, so that the vehicle may pass road sections where no or only limited filling of the transfer tank may be carried out, the vehicle may be driven without requiring refueling. The estimated range may then e.g. be used in order to, at an applicable point in time, indicate to the driver that refueling is required, and the driver may also be informed about where refueling should be done at the latest, or it may be used in order to indicate that the vehicle should be stopped to avoid stalling in an undesired spot.

Furthermore, if it is determined e.g. that the range will be limited due to unfavorable conditions, e.g. in the form of road gradient and/or expected unfavorable sloshing conditions, it may also be determined whether the estimated range is sufficient for the vehicle to be able to reach the expected or the next possible filling station for refueling. Accordingly, it may also be determined whether the vehicle should return to a filling station, or whether the vehicle should be stopped before the fuel completely runs out, e.g. to facilitate stopping on a plane surface instead of on an uphill or downhill slope. The method may then be completed in step 305, or alternatively return to step 301 for a new determination.

Overall, the present invention thus provides a method, which facilitates a greater part of the fuel in the main tank being used, without risking unwanted stalling. The invention allows different sized extractions of fuel from the main tank, depending on the appearance of the road ahead of the vehicle. When the vehicle is travelling mainly along a plane road, larger extractions may be permitted, while a more uneven base may entail that a larger reserve is required. The fuel reserve may thus be permitted to vary according to the present invention.

Further, the use of electrically controlled pumps has the advantage of eliminating the risk of unwanted cavitation. If a fuel pump of conventional type is used, i.e. a fuel pump which is powered by the combustion engine's output shaft, this will, begin to cavitate if it starts to draw air, with the consequence that the pump cannot draw fuel again without first being stopped, which thus also means that the vehicle must be stopped before the fuel supply may be resumed.

According to the present example, e.g. the control current to the electric motor 222 may be used to detect whether the fuel pump 212 starts to draw air and thus begins to cavitate, whereat the fuel pump, through the electric motor, may be controlled as needed, and also be stopped to be restarted. The fuel pump 212 may also be rotated at different engine speeds to facilitate different flows.

The fuel pump 212 may thus be started and stopped as needed, to facilitate periods where fuel is not transferred to the transfer tank, whereat the transfer tank may then be filled again when more favorable driving conditions prevail and fuel becomes available again for the fuel pump 212. In combination with data relating to the road ahead of the vehicle, a very good estimation of the vehicle's range may thus be made, wherein data relating to the road ahead of the vehicle are also used to estimate the expected fuel consumption, and thus the expected fuel expenditure for future road sections.

As mentioned above, the present invention is not limited, however, to fuel systems with electrically powered fuel pumps, or to systems with a transfer tank, even if these features provide additional possibilities. The invention is thus applicable in conventional fuel systems, where mainly the required fuel reserve may be controlled, based on data relating to the road ahead of the vehicle.

Other embodiments of the method and the system according to the invention are available in the claims enclosed hereto. It should also be noted that the system may be modified according to various embodiments of the method according to the invention (and vice versa) and that the present invention is in no way limited to the above embodiments of the method according to the invention, but relates to and comprises all embodiments within the scope of the enclosed independent claims.

The invention claimed is:

1. A method for estimating a range of a distance that a vehicle may travel without refueling, wherein said vehicle comprises a combustion engine and a fuel supply system associated with said combustion engine, wherein the vehicle also comprises a first main tank for receiving fuel, and a first fuel pump for transfer of fuel from said first main tank to said fuel supply system, wherein the method comprises:
based on data relating to the road ahead of the vehicle and a first measure of a residual fuel in said first main tank, estimating a range for said vehicle;
based on said data relating to the road ahead of the vehicle, controlling a required fuel reserve.

2. The method according to claim 1, wherein said first fuel pump consists of a fuel pump powered by an electric engine.

3. The method according to claim 1, wherein said vehicle also comprises a transfer tank, arranged between said fuel supply system and said first main tank, wherein the method comprises supplying fuel to said transfer tank from said first main tank before transferring to said fuel supply system, and wherein said transfer tank constitutes a smaller tank compared to said first main tank.

4. The method according to claim 3, wherein said transfer tank consists of a tank with a height, which consists of a higher height compared to the width and the depth.

5. The method according to claim 3, wherein the size of the transfer tank is in the range 15-50 liters, or of a size which, in relation to the total volume of one or several main tanks, constitutes a volume within the range 1-10% or 1-5% of the total volume of said main tanks.

6. The method according to claim 3, wherein fuel is supplied to said fuel supply system from said transfer tank via a second fuel pump.

7. The method according to claim 6, wherein said second fuel pump consists of an electrically powered fuel pump.

8. The method according claim 3, further comprising:
estimating said first measure of residual fuel in said first main tank, at least partly based on a rate at which said transfer tank is filled with fuel from said first main tank.

9. The method according to claim 3, also comprising estimating said range, at least partly based on the expected possibilities of filling said transfer tank.

10. The method according to claim 1, further comprising:
estimating said first measure of residual fuel in said first main tank, at least partly based on a float arranged in said first main tank.

11. The method according to claim 1, further comprising:
estimating said first measure of residual fuel in said first main tank, at least partly based on the size of a drive current for an electric motor that powers said first fuel pump.

12. The method according to claim 1, wherein said vehicle comprises at least a first and a second main tank, wherein said first and second main tanks are in fuel transferring connection with each other, and wherein the method comprises transfer of fuel from said first and second main tanks to said transfer tank, via said first fuel pump.

13. The method according to claim 1, wherein the method is carried out when the expected residual amount of fuel in said first main tank falls below a first amount of fuel.

14. A computer program product for estimating a range a range of a distance that a vehicle may travel without refueling, wherein said vehicle comprises a combustion engine and a fuel supply system associated with said combustion engine, wherein the vehicle also comprises a first main tank for receiving fuel, and a first fuel pump for transfer of fuel from said first main tank to said fuel supply system, said computer program product located on a non-transitory computer readable medium, comprising instructions for operation by a computing device, said instructions comprising:
instructions configured for estimating a range for said vehicle based on data relating to the road ahead of the vehicle and a first measure of a residual fuel in said first main tank; and
instructions configured for controlling a required fuel reserve based on said data relating to the road ahead of the vehicle.

15. A system for estimating a range of a distance that a vehicle may travel without refueling, wherein said vehicle comprises a combustion engine and a fuel supply system associated with said combustion engine, wherein the vehicle also comprises a first main tank for receiving fuel and a first fuel pump for transfer of fuel from said first main tank to said fuel supply system, wherein the system comprises a processing device configured for:
based on data relating to the road ahead of the vehicle and a first measure of a residual fuel in said first main tank, estimating a range for said vehicle; and
based on said data relating to the road ahead of the vehicle, controlling a required fuel reserve.

16. A system according to claim 15 further comprising a computer program product located on a non-transitory computer readable medium, comprising instructions for operation by said processing device to cause said processing device to:
- estimate a range for said vehicle based on data relating to the road ahead of the vehicle and a first measure of a residual fuel in said first main tank; and
- control a required fuel reserve based on said data relating to the road ahead of the vehicle.

17. A vehicle comprising a combustion engine, a fuel supply system associated with said combustion engine, a first main tank for receiving fuel and a first fuel pump for transfer of fuel from said first main tank to said fuel supply system, said combustion engine further comprising a processing device for estimating a range of a distance that a vehicle may travel without refueling, said processing device configured for:
- based on data relating to the road ahead of the vehicle and a first measure of a residual fuel in said first main tank, estimating a range for said vehicle; and
- based on said data relating to the road ahead of the vehicle, controlling a required fuel reserve.

18. A vehicle according to claim 17 further comprising a computer program product located on a non-transitory computer readable medium, comprising instructions for operation by said processing device to cause said processing device to:
- estimate a range for said vehicle based on data relating to the road ahead of the vehicle and a first measure of a residual fuel in said first main tank; and
- control a required fuel reserve based on said data relating to the road ahead of the vehicle.

* * * * *